US012769514B2

(12) United States Patent
Li et al.

(10) Patent No.: US 12,769,514 B2
(45) Date of Patent: Oct. 20, 2026

(54) DATA PROCESSING METHOD AND INTERACTION SYSTEM

(71) Applicant: Huawei Technologies Co., Ltd., Shenzhen (CN)

(72) Inventors: Weihua Li, Dongguan (CN); Taixu Tian, Dongguan (CN); Shunfang Li, Shenzhen (CN); Yu Hao, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 1030 days.

(21) Appl. No.: 17/954,666

(22) Filed: Sep. 28, 2022

(65) Prior Publication Data

US 2023/0101493 A1 Mar. 30, 2023

(30) Foreign Application Priority Data

Sep. 30, 2021 (CN) .......................... 202111166663.7

(51) Int. Cl.

*G06F 16/903* (2019.01)
*G06F 7/57* (2006.01)
*G06F 13/40* (2006.01)
*G06F 16/28* (2019.01)
*G06F 16/906* (2019.01)

(52) U.S. Cl.

CPC ............ *G06F 7/57* (2013.01); *G06F 13/4022* (2013.01)

(58) Field of Classification Search

None

See application file for complete search history.

(56) References Cited

U.S. PATENT DOCUMENTS 5,282,153 A * 1/1994 Bartkowiak .............. G06F 7/57 708/209
12,614,001 B2 * 4/2026 Galles ..................... G06F 21/74
2006/0149932 A1 * 7/2006 Gerardus de Vries .... G06F 7/57 712/218
2007/0067379 A1 3/2007 Motozuka et al.
2007/0182746 A1 * 8/2007 Jiao ..................... G06F 9/30036 345/502
2008/0307206 A1 12/2008 Vaclavik et al.
2011/0173386 A1 * 7/2011 Milliken ................. G06F 15/16 711/108
2012/0017066 A1 1/2012 Vorbach et al.

(Continued)

*Primary Examiner* — Hyun Nam

(74) *Attorney, Agent, or Firm* — Conley Rose, P.C.

(57) ABSTRACT

A data processing method applied to a programmable chip, includes a logic classification unit (LCU) that obtains, based on first data received through a data bus, at least first target classified data (TCD) and second TCD, and sends the first and second TCD to a corresponding first arithmetic logic unit (ALU) and a corresponding second ALU based on a preset mapping relationship. The LCU classifies target execution information obtained through preprocessing an entry by a ternary content addressable memory (TCAM) and service data, so that an instruction memory determines first and second information, and sends the first and second information to the corresponding first and second ALUs. The first and second ALUs respectively send, through the data bus, data obtained through performing calculation based on the first TCD and the first information and data obtained through performing calculation based on the second TCD and the second information.

20 Claims, 10 Drawing Sheets

(56) References Cited

U.S. PATENT DOCUMENTS

| | | | | |
|---|---|---|---|---|
| 2014/0122554 | A1* | 5/2014 | Hickmann | G06F 7/60 708/523 |
| 2015/0373688 | A1* | 12/2015 | Samuel Raj | H04L 63/108 370/329 |
| 2016/0342415 | A1* | 11/2016 | Okazaki | G06F 9/3838 |
| 2017/0269931 | A1 | 9/2017 | Hwang et al. | |
| 2018/0307483 | A1* | 10/2018 | Luo | G06F 15/7871 |
| 2020/0387452 | A1* | 12/2020 | Vasyltsov | G06N 3/063 |
| 2022/0166859 | A1* | 5/2022 | Brima | H04L 69/22 |
| 2022/0398207 | A1* | 12/2022 | Norrie | G06F 13/4022 |
| 2023/0101493 | A1* | 3/2023 | Li | G06F 13/4022 |
| 2023/0127722 | A1* | 4/2023 | Ibanez | G06F 9/5016 719/318 |
| 2023/0325347 | A1* | 10/2023 | Young | G06F 15/8069 712/19 |
| 2025/0286938 | A1* | 9/2025 | Biradar | H04L 12/4633 |
| 2026/0087395 | A1* | 3/2026 | Gupta | G06N 10/60 |

* cited by examiner

DATA PROCESSING METHOD AND INTERACTION SYSTEM

CROSS-REFERENCE TO RELATED APPLICATIONS

This application claims priority to Chinese Patent Application No. 202111166663.7, filed on Sep. 30, 2021, which is hereby incorporated by reference in its entirety.

TECHNICAL FIELD

Embodiments of this application relate to the chip field, and in particular, to a data processing method and an interaction system.

BACKGROUND

In a general programmable processing architecture, an arithmetic logic unit (ALU) is usually used as a core unit. The ALU may complete different functions according to execution instructions and randomly process to-be-processed data. Therefore, the ALU has high processing flexibility and good scalability, and can effectively adapt to development and changes of network services.

Refer to FIG. 1. To implement random programmability in an ALU array in the currently used programmable processing architecture, each ALU in the ALU array needs to be capable of accessing any data. Therefore, each ALU is interconnected to any output interface of a data bus, and can access any data on the data bus.

With rapid development of the Internet industry, services continuously become more complex. To process the complex services, a quantity of ALUs that need to participate in calculation increases. Accordingly, interconnection relationships between the ALUs and data also increase. Consequently, more connection resources need to be added. This results in huge costs for physical implementation.

SUMMARY

Embodiments of this application provide a data processing method and an interaction system, which may be applied to a programmable chip. A logic classification unit obtains data of different categories based on received data, and sends the data of different categories to a corresponding classified ALU. The ALU in this case can access only corresponding data, and no longer access any data. Therefore, connection lines or connections between the ALU and a data bus for data transmission are reduced, to save connection resources and reduce costs for physical implementation.

A first aspect of embodiments of this application provides a data processing method. The method includes obtaining at least first target classified data and second target classified data based on received first data, where the first target classified data and the second target classified data are data that is of different categories and that is obtained through processing the first data based on data intersection between different functions of services, and the first data includes entry return data that is generated through preprocessing an entry, and service data, and sending, based on a preset mapping relationship, the first target classified data to a first ALU, and the second target classified data to a second ALU, where the first ALU and the second ALU are of different categories.

In embodiments of this application, a logic classification unit obtains, through classification of the first data received through the data bus, the first target classified data and the second target classified data that are of at least two categories, and sends the first target classified data and the second target classified data to the corresponding first ALU and the corresponding second ALU based on the preset mapping relationship. Because an ALU receives only data of a corresponding category based on the preset mapping relationship, and no longer has a connection relationship with all data, connection lines or connections between the ALU and the data bus for data transmission are reduced, so that connection resources are saved, and accordingly, costs for physical implementation are reduced.

In a possible implementation of the first aspect, the first ALU does not receive the second target classified data.

In embodiments of this application, if the first ALU does not receive the second target classified data, it indicates that there is no connection relationship between the first ALU and the second target classified data. This reduces connection lines or connections between the ALU and the data bus, and saves resources.

In a possible implementation of the first aspect, third target classified data may be further obtained based on the first data, and the third target classified data is sent to the first ALU and the second ALU. The third target classified data may be data that participates in calculation of the first ALU and the second ALU, or may be data that participates in calculation of all ALUs.

In embodiments of this application, the third target classified data is obtained based on the first data, the third target classified data is sent to the first ALU and the second ALU, and the data that participates in the calculation of the first ALU and the second ALU is processed as one category and transmitted to the first ALU and the second ALU. This improves an application scope of the solution and ensures reliability of the solution, so that the solution is applicable to more application scenarios.

In a possible implementation of the first aspect, the method is performed by the logic classification unit.

In embodiments of this application, it is indicated that the method is performed by the logic classification unit, so that an implementation body is specified, and a specific application scenario of the solution is shown.

In a possible implementation of the first aspect, the logic classification unit includes at least any one of a cross matrix, a logic circuit, or a logic component.

In embodiments of this application, the logic classification unit includes at least any one of the cross matrix, the logic circuit, or the logic component. This reflects flexibility and multi-scenario application of the solution.

In a possible implementation of the first aspect, the entry is an entry obtained through querying the service data.

In embodiments of this application, that the entry is obtained through querying the service data is described, so that a source of the entry is limited, and the application scenario of the solution is specified.

In a possible implementation of the first aspect, the service data is data determined based on a preset identifier.

In embodiments of this application, that the service data is the data determined based on the preset identifier is described, so that the solution is further refined, and the reliability of the solution is improved.

In a possible implementation of the first aspect, at least first execution information and second execution information may be obtained based on target execution information, where the first execution information and the second execution information are information that is of different categories and that is obtained through processing the target execution information based on the data intersection between the different functions of the services, and the target execution information is information obtained through pre-processing the entry and the service data by a ternary content-addressable memory (TCAM).

Then, the first execution information and the second execution information are sent to an instruction memory, so that the instruction memory determines first information and second information based on the first execution information and the second execution information, and sends the first information to the first ALU, and the second information to the second ALU.

In this embodiment of this application, at least the first execution information and the second execution information are obtained based on the target execution information. Based on this, the first information and the second information are obtained. Then, the first information and the second information are respectively sent to the first ALU and the second ALU, to reduce connections for the instruction memory to obtain information, so that the resources are saved and the costs for physical implementation are reduced.

In a possible implementation of the first aspect, the mapping relationship is a mapping relationship between an ALU and target classified data. The ALU includes at least the first ALU and the second ALU, the target classified data includes at least the first target classified data and the second target classified data, the first ALU corresponds to the first target classified data, and the second ALU corresponds to the second target classified data.

Alternatively, the mapping relationship includes at least two connection relationships of classified connections, namely, at least a first connection relationship and a second connection relationship. The first connection relationship is a connection relationship between a first output interface of the data bus and a read interface of the first ALU, the second connection relationship is a connection relationship between a second output interface of the data bus and a read interface of the second ALU, and there is no intersection between the first output interface and the second output interface.

In this embodiment of this application, the mapping relationship may be the mapping relationship between the ALU and the corresponding target classified data. In this solution, a hardware connection relationship does not need to be considered, and the target classified data that is obtained through classification may be interconnected, in a customized manner, with an ALU that is of a specific category and that is obtained through classification. This increases application scenarios of the solution and improves flexibility of the solution. Alternatively, the mapping relationship may be the connection relationship between each of the first output interface and the second output interface of the data bus and the corresponding ALU. By using the mapping relationship, data may be obtained more directly, thereby improving efficiency.

In addition, in some embodiments, a connection relationship between a third output interface or a fourth output interface and a corresponding ALU is further included, thereby improving the flexibility of the solution.

In a possible implementation of the first aspect, when the target classified data further includes the third target classified data, the mapping relationship further includes a mapping relationship between the first ALU and the third target classified data and a mapping relationship between the second ALU and the third target classified data.

Alternatively, the mapping relationship further includes third connection relationships, and the third connection relationships are a connection relationship between a third output interface of the data bus and the read interface of the first ALU and a connection relationship between the third output interface of the data bus and the read interface of the second ALU.

In this embodiment of this application, the mapping relationship further includes the mapping relationship between the third target classified data and the first ALU and the mapping relationship between the third target classified data and the second ALU, or the connection relationship between the third output interface of the data bus and the read interface of the first ALU and the connection relationship between the third output interface of the data bus and the read interface of the second ALU. This increases the application scenarios of the solution and improves the flexibility of the solution.

In a possible implementation of the first aspect, when the first ALU and the second ALU belong to an $N^{th}$ sequence in an ALU array, and N is greater than or equal to 2, the first ALU obtains, based on the mapping relationship, fourth target classified data from data output by an ALU of an $(N-1)^{th}$ sequence in the ALU array, and sends, based on a preset fourth connection relationship, third calculated data obtained through performing calculation based on the first target classified data, the fourth target classified data, and the first information.

The second ALU obtains, based on the mapping relationship, fifth target classified data from the data output by the ALU of the $(N-1)^{th}$ sequence in the ALU array, and sends, based on the preset fourth connection relationship, fourth calculated data obtained through performing calculation based on the second target classified data, the fifth target classified data, and the second information.

In this embodiment of this application, when the first ALU and the second ALU belong to the $N^{th}$ sequence in the ALU array, the first ALU and the second ALU each obtain a calculation result of the ALU of the $(N-1)^{th}$ sequence in the ALU array based on the preset mapping relationship, and then the data bus transmits the third calculated data and the fourth calculated data that are sent, based on the preset first connection relationship, by the first ALU and the second ALU, to ensure that all ALUs in the ALU array may obtain, based on the preset mapping relationship, data that is of a corresponding category and that is for performing calculation, and output a final calculation result. In addition to ensuring the reliability of the solution, this reduces occupation of connection resources as much as possible, so that the costs for physical implementation are reduced as much as possible.

In a possible implementation of the first aspect, the fourth connection relationship is full connection between the data bus and a calculation output interface of the ALU, where the full connection indicates that the calculation output interface of the ALU is connected to any input interface of the data bus, and the ALU includes at least the first ALU and the second ALU.

Alternatively, the fourth connection relationships include at least two connection relationships of classified connections, namely, at least a fifth connection relationship and a sixth connection relationship. The fifth connection relationship is a connection relationship between a first input interface of the data bus and a calculation output interface of the first ALU, the sixth connection relationship is a connection relationship between a second input interface of the data bus and a calculation output interface of the second ALU, and there is no intersection between the first input interface and the second input interface.

In this embodiment of this application, the fourth connection relationship may be the full connection between the data bus and the calculation output interface of the ALU. By using the full connection, the flexibility of the solution and flexibility of a system may be improved, so that the solution is applicable to more scenarios. Alternatively, the fourth connection relationships may be the connection relationships of classified connections between the first input interface of the data bus and the corresponding first ALU and between the second input interface of the data bus and the corresponding second ALU. The connection relationships of the classified connections further reduce a quantity of connections between the ALU and the data bus, to further save the connection resources and reduce, to a greater extent, the costs for physical implementation.

A second aspect of embodiments of this application provides a data processing method. The method includes the following.

A TCAM obtains target execution information based on a received entry and received service data. The entry is an entry obtained through querying the service data, and the service data is data determined based on a preset identifier.

After obtaining the target execution information, the TCAM processes the target execution information based on data intersection between different functions of services, to obtain at least first execution information and second execution information.

Then, the TCAM sends the first execution information and the second execution information to an instruction memory. In this way, the instruction memory queries corresponding first information and corresponding second information based on the first execution information and the second execution information, and sends the first information to a first ALU. The first ALU performs calculation on received data based on the first information. The instruction memory sends the second information to a second ALU. The second ALU performs calculation on received data based on the second information. The first ALU and the second ALU are ALUs that are of different categories and that are obtained through classification performed by an ALU array based on preset category identifiers.

In this embodiment of this application, the TCAM classifies and preprocesses the entry and the service data to obtain the target execution information, and processes the target execution information to obtain at least the first execution information and the second execution information, so that the instruction memory sends, based on the first execution information and the second execution information, the corresponding first information and the corresponding second information to the first ALU and the second ALU, to ensure that an ALU may normally perform calculation and ensure reliability of the solution.

A third aspect of embodiments of this application provides a data processing method. The method includes the following.

An ALU determines, based on a preset category identifier, a category to which the ALU belongs. In this case, the ALU may receive corresponding target classified data based on a preset mapping relationship. The target classified data is data that is of one of at least two categories and that is obtained through processing first data based on data intersection between different functions of services. The first data includes service data, and entry return data that is generated through preprocessing an entry, where the entry is obtained through querying the service data, and the service data is determined based on a preset identifier.

Then, the ALU obtains corresponding target information, where the target information is determined by an instruction memory based on received execution information. The execution information is execution information that is of one of at least two categories and that is obtained through processing performed on target execution information based on data intersection between different functions of a service, and the target execution information is information obtained through preprocessing performed on the entry and the service data by a TCAM.

The ALU may perform calculation on the target classified data based on the target information, to obtain target calculated data.

The ALU sends, based on a preset fourth connection relationship, the target calculated data obtained through the calculation.

In this embodiment of this application, the ALU receives and processes only corresponding classified data, and is no longer connected to all data. This reduces interaction between the ALU and the data, reduces connection lines between the ALU and a data bus, and accordingly reduces costs for physical implementation.

A fourth aspect of embodiments of this application provides an interaction system. The interaction system has a function of implementing the method according to any one of the first aspect, the possible implementations of the first aspect, the second aspect, or the third aspect. The function may be implemented by hardware, or may be implemented by hardware executing corresponding software. The hardware or the software includes one or more modules corresponding to the foregoing function.

The interaction system according to the fourth aspect of embodiments of this application performs the method described in any one of the first aspect, the possible implementations of the first aspect, the second aspect, or the third aspect of embodiments of this application.

A fifth aspect of embodiments of this application provides an interaction system, and the interaction system may include a memory, a processor, and a bus system. The memory is configured to store a program, the processor is configured to invoke the program stored in the memory, to perform the method according to any one of the first aspect, the possible implementations of the first aspect, the second aspect, or the third aspect of embodiments of this application.

A sixth aspect of embodiments of this application provides a computer-readable storage medium. The computer-readable storage medium stores instructions. When the instructions are run on a computer, the computer is enabled to perform the method according to any one of the first aspect or the possible implementations of the first aspect.

A seventh aspect of embodiments of this application provides a computer program. When the computer program runs on a computer, the computer is enabled to perform the method according to any one of the first aspect or the possible implementations of the first aspect.

An eighth aspect of embodiments of this application provides a chip. The chip includes at least one processor and at least one interface circuit. The interface circuit is coupled to the processor. The at least one interface circuit is configured to perform a receiving and sending function, and send instructions to the at least one processor. The at least one processor is configured to run a computer program or the instructions, and has a function of implementing the method according to any one of the first aspect or the possible implementations of the first aspect. The function may be implemented by hardware, or may be implemented by software, or may be implemented by a combination of hardware and software. The hardware or the software includes one or more modules corresponding to the function.

DESCRIPTION OF EMBODIMENTS

Embodiments of this application provide a data processing method and an interaction system, which are applied to a programmable chip. After received data that needs to be sent to an ALU is classified, the data is sent to a corresponding classified ALU. The ALU in this case can access only corresponding data, and no longer access any data. Therefore, connection lines between the ALU and a data bus are reduced, to save connection resources and reduce costs for physical implementation.

In the specification, claims, and accompanying drawings of this application, the terms "first", "second", and so on are intended to distinguish between similar objects but do not necessarily indicate a specific order or sequence. It should be understood that the terms used in such a way are interchangeable in proper circumstances, which is merely a discrimination manner that is used when objects having a same attribute are described in embodiments of this application. In addition, the terms "include", "contain", and any other variants mean to cover the non-exclusive inclusion, so that a process, method, system, product, or device that includes a series of units is not necessarily limited to those units, but may include other units not expressly listed or inherent to such a process, method, system, product, or device. In some embodiments of this application, the data bus may alternatively be replaced with another type of bus or a communication protocol line.

Before embodiments of this application are described, a currently common programmable processing architecture is first briefly described, to facilitate subsequent understanding of embodiments of this application.

Figure 1:
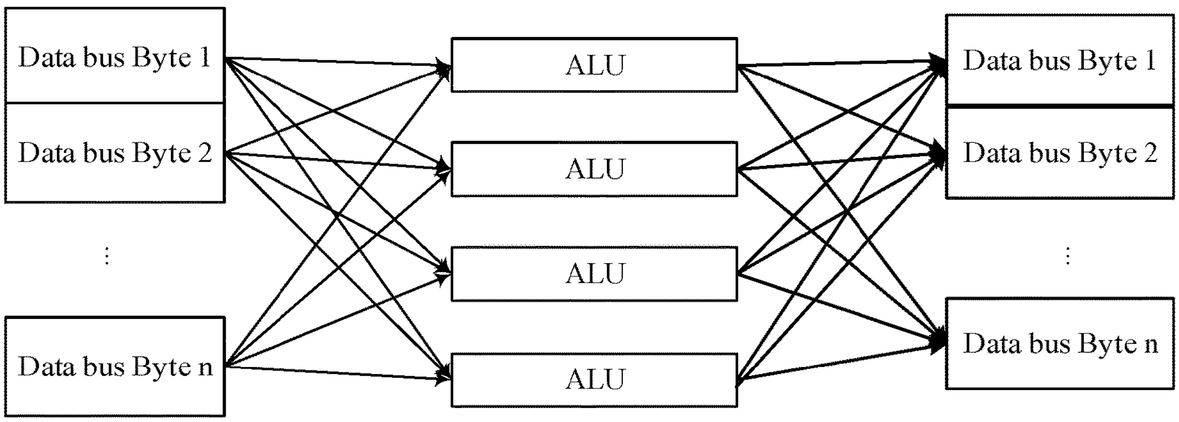
FIG. 1 (Prior Art)
FIG. 1 is a schematic diagram of full interconnection between ALUs and data.
Figure 2:
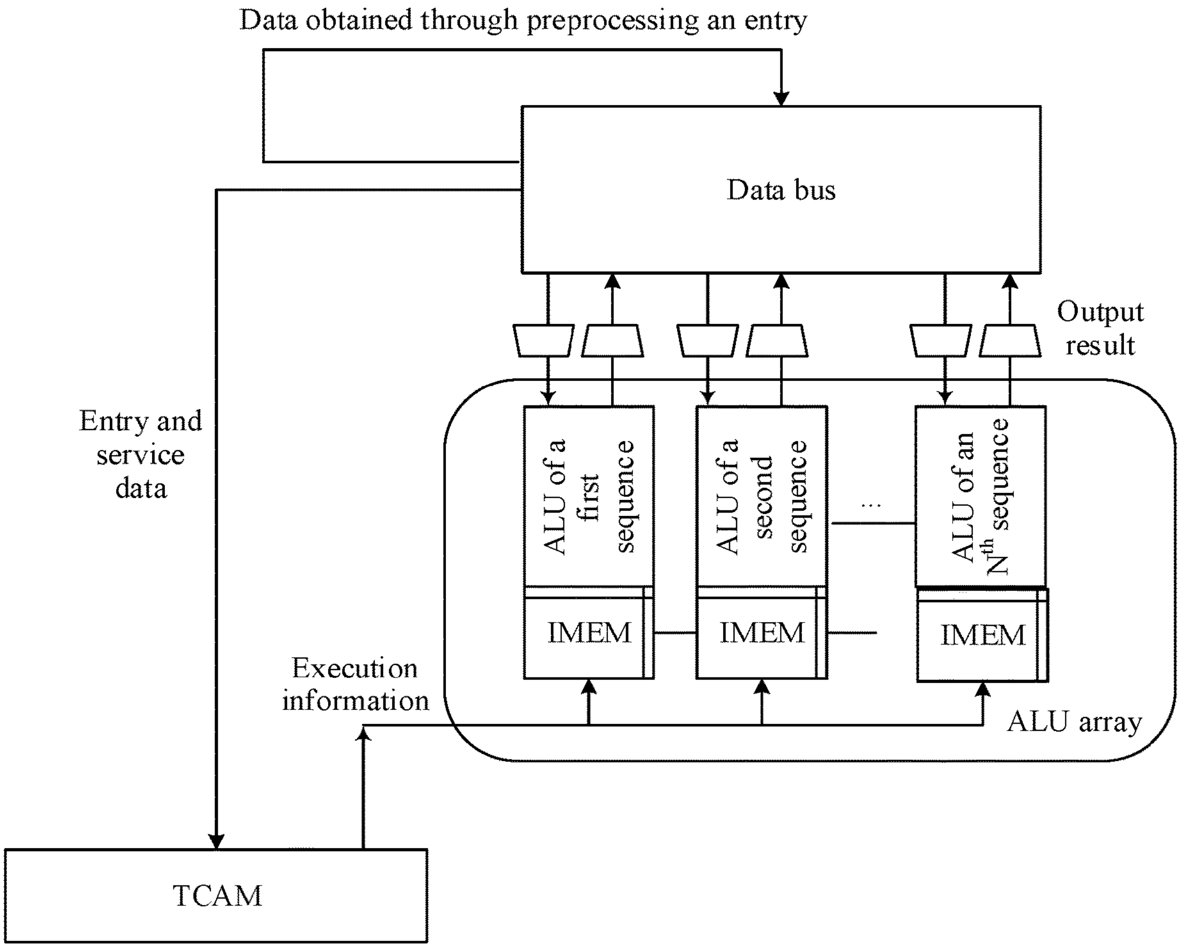
FIG. 2 is a schematic diagram of a programmable processing architecture.
Figure 3:
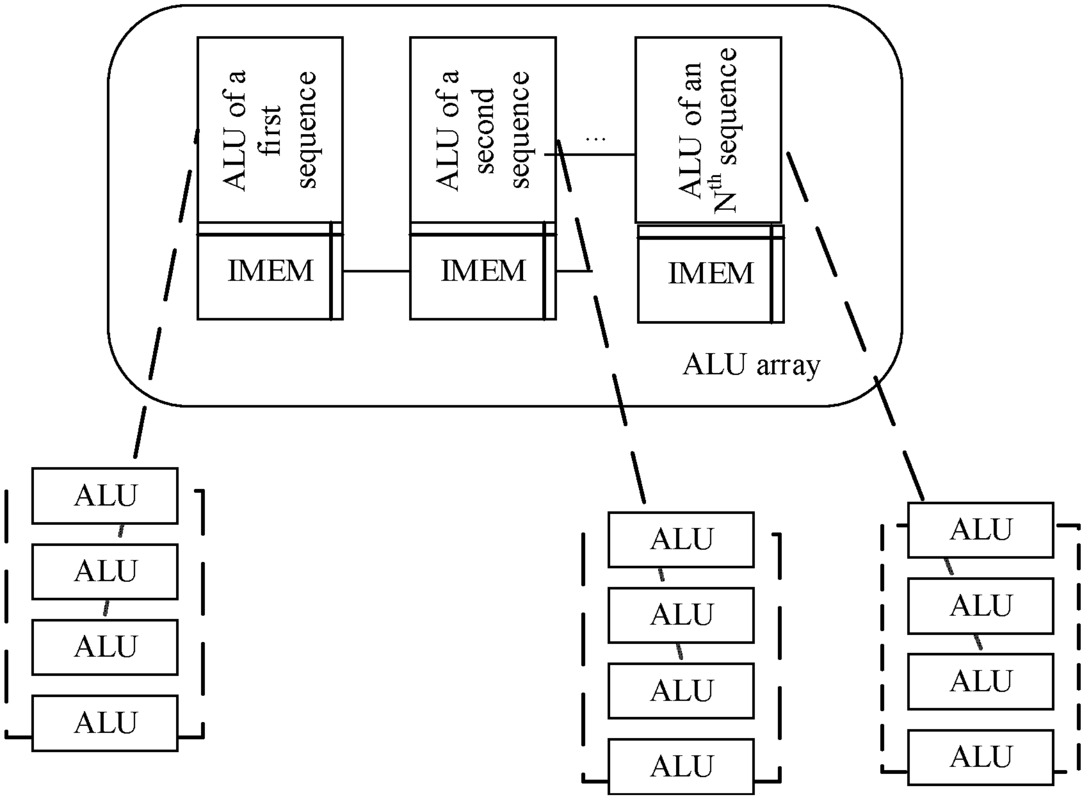
FIG. 3 is a schematic diagram of an ALU array.

For details, refer to FIG. 2. FIG. 2 is a schematic diagram of a programmable processing architecture. A data bus is connected to a TCAM, and each output interface of the data bus is fully interconnected to each ALU in an ALU array. The ALU array includes ALUs of a plurality of sequences and an instruction memory (IMEM), and each sequence includes a plurality of ALUs (as shown in FIG. 3). The TCAM is connected to the instruction memory, and the instruction memory is connected to the ALUs. To facilitate understanding of a data processing procedure, the following first describes related units.

ALU: The ALU is a digital circuit that performs arithmetic and logic calculation. The ALU is an execution unit of a computer central processing unit, and is a core component of all central processing units. The ALU includes an AND gate and an OR gate, and centrally performs arithmetic and logic operations indicated by computer instructions. An input of the ALU is to-be-operated data and instruction code from a control unit, indicating to-be-performed calculation. An output of the ALU is a calculation result. The input and output are performed through the bus.

TCAM: The TCAM is mainly for quickly searching for entries such as an access control list (ACL) and a route.

Instruction memory: The instruction memory stores ALU operation instructions, determines the operation instructions and calculation steps based on execution information sent by the TCAM, and sends the operation instructions and calculation steps to a corresponding ALU.

The data processing procedure of the foregoing programmable processing architecture is as follows. Service data is determined based on a preset identifier (a fixed value written into a fixed address field or fixed information carried in a packet that are preset by an operator or a developer), and an entry may be obtained through querying the service data, and entry return data is obtained through preprocessing the entry. The service data and the entry from the data bus are transmitted to the TCAM. The entry return data that is obtained through preprocessing the entry, and the service data is transmitted to ALUs of each sequence in the ALU array. After preprocessing the service data and the entry, the TCAM obtains execution information of calculation to be performed by the ALU, and sends the execution information to the instruction memory IMEM of each sequence in the ALU array. The IMEM determines a specific calculation step and calculation operation of the ALU based on the execution information, and sends the calculation step and the calculation operation to the ALU. In addition, ALUs of a first sequence in the ALU array perform correct calculation based on the received calculation step and calculation operation that are sent by the IMEM, and output a calculation result. ALUs of a second sequence in the ALU array further obtain, through the data bus, the output result of the ALUs of the first sequence based on the received calculation step and calculation operation that are sent by the IMEM, and perform calculation on the output result of the ALUs of the first sequence, the entry return data, and the service data based on the calculation step and calculation operation that are sent by the IMEM, until ALUs of an $N^{th}$ sequence output a final calculation result.

However, as services become more complex, a width of the data bus continuously increases, a quantity of ALUs in the foregoing programmable processing architecture increases, and full interconnections between data and the ALU also increase. As a result, requirements for connection lines between the ALU and the data bus increase exceptionally, and costs for physical implementation are huge.

To resolve the foregoing problem, embodiments of this application provide a data processing method and an interaction system. The interaction system is applied to a programmable chip, and is configured to classify data on which an ALU needs to perform calculation processing and send the classified data to a corresponding classified ALU for the calculation processing. Because the ALU is interconnected only with data of a corresponding category, connection lines or connections between the ALU and a data bus are reduced, and therefore costs for physical implementation are reduced.

Figure 4:
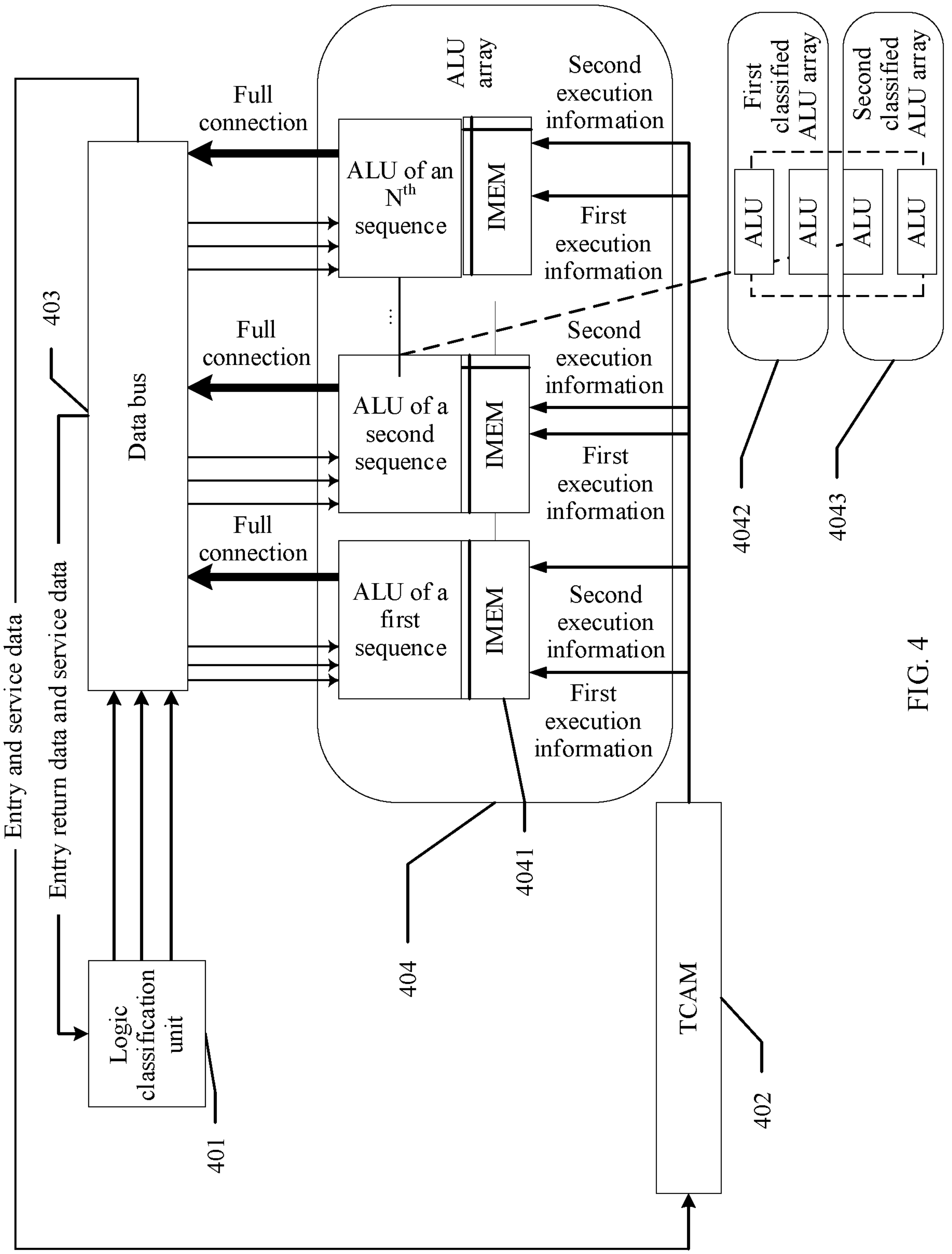
FIG. 4 is a schematic diagram of an architecture of an interaction system according to an embodiment of this application.
Figure 5:
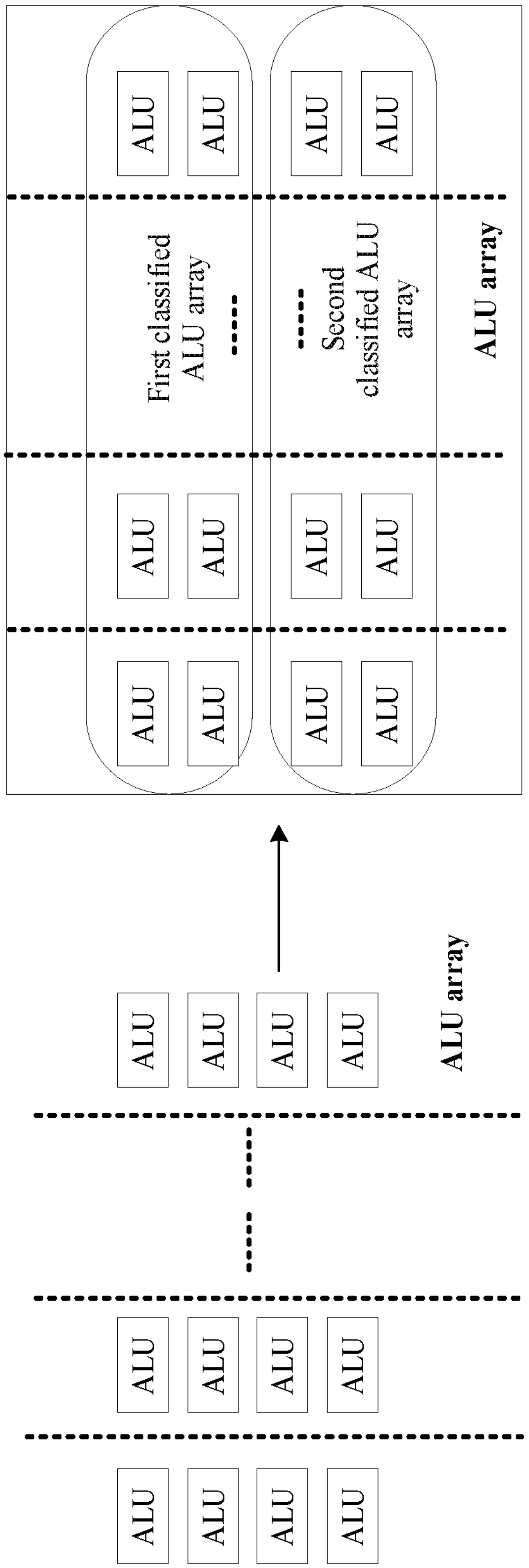
FIG. 5 is a schematic diagram of ALU array classification according to an embodiment of this application.

The following describes the interaction system according to embodiments of this application with reference to the accompanying drawings. A person of ordinary skill in the art may learn that, with technology development and emergence of a new scenario, the technical solutions provided in embodiments of this application are also applicable to resolving a similar technical problem. For details, refer to FIG. 4. FIG. 4 is a schematic diagram of an architecture of an interaction system according to an embodiment of this application. The interaction system further includes a logic classification unit 401, a TCAM 402, a data bus 403, and an ALU array 404. The ALU array 404 includes ALUs of at least N sequences and corresponding IMEMs 4041, and the ALU array 404 is classified, based on a preset category identifier, into at least two categories: a first classified ALU array 4042 and a second classified ALU array 4043. For details, refer to FIG. 5. FIG. 5 is a schematic diagram of ALU array classification according to an embodiment of this application. In this embodiment of this application, the ALU array 404 classifies the ALUs based on the preset category identifier. Optionally, the preset category identifiers are different fixed values set by an operator or a developer in a fixed address field for ALU classification, or fixed characters of other categories defined for ALU classification, or attributes of ALUs each used for ALU classification. This is not limited herein. In embodiments of this application, only ALUs of two categories are used as an example for description. In another embodiment, there may be more categories. This is not limited herein.

The logic classification unit 401 classifies received first data transmitted through the data bus 403 based on a classification scheme defined based on data intersection between different functions of services. The first data includes entry return data that is generated through preprocessing an entry, and service data. Data of an ALU in the corresponding first classified ALU array 4042 and data of an ALU in the corresponding second classified ALU array 4043 is obtained through classification. If a preset classification scheme defines global data that participates in calculation of all ALUs, the global data may be further obtained.

The logic classification unit 401 further sends, through the data bus 403, the classified data to the ALU in the corresponding first classified ALU array 4042 or the corresponding second classified ALU array 4043 after classification, and sends the global data to all the ALUs in the ALU array 404.

In addition, the TCAM 402 classifies and preprocesses the received entry and service data to obtain target execution information, and then classifies the target execution information based on the classification scheme defined based on the data intersection between the different functions of the services. The TCAM has a function of the logic classification unit 401 or includes the logic classification unit 401 through configuration, so that the TCAM may classify the target execution information. Therefore, the logic classification unit 401 similar to that mentioned above is not required herein. Alternatively, the target execution information may be sent to the logic classification unit 401 for classification via the TCAM. After the target execution information is classified, at least first execution information and second execution information are obtained, and the first execution information and the second execution information are sent to the IMEM 4041.

Then, the IMEM 4041 sends, based on the first execution information or the second execution information, corresponding first information and second information that includes a calculation operation to the ALU in the first classified ALU array 4042 or the ALU in the second classified ALU array 4043 respectively.

After receiving required data and an operation indication, the ALU in the first classified ALU array 4042 or the second classified ALU array 4043 performs calculation, and sends data obtained through the calculation through the data bus 403.

Starting from the second sequence in the ALU array, data obtained through calculation of an ALU of a previous sequence through the data bus is further added to the data of the ALU in the first classified ALU array 4042 and the data corresponding to the ALU in the second classified ALU array 4043 in each sequence, and is determined and obtained based on a preset mapping relationship and the corresponding first execution information and second execution information. A final calculation result is output through the data bus 403 when an ALU of the last sequence completes calculation.

In the interaction system in this embodiment of this application, the logic classification unit classifies the received data, and sends the classified data to the ALU of the corresponding category in the ALU array through the data bus. Therefore, the ALU may directly obtain the corresponding classified data, and does not need to access any data. Therefore, connection lines or connections between each ALU and the data bus are reduced, thereby reducing an implementation area of a chip and costs for physical implementation.

In some embodiments of this application, the logic classification unit includes but is not limited to any one of the following specific forms: a cross matrix, a logic component, or a logic circuit. This is not limited herein.

The interaction system in embodiments of this application is applied to a programmable chip, or may be applied to all devices or application scenarios in which the programmable chip is used, for example, a router or a switch. This is not limited herein.

Figure 6A:
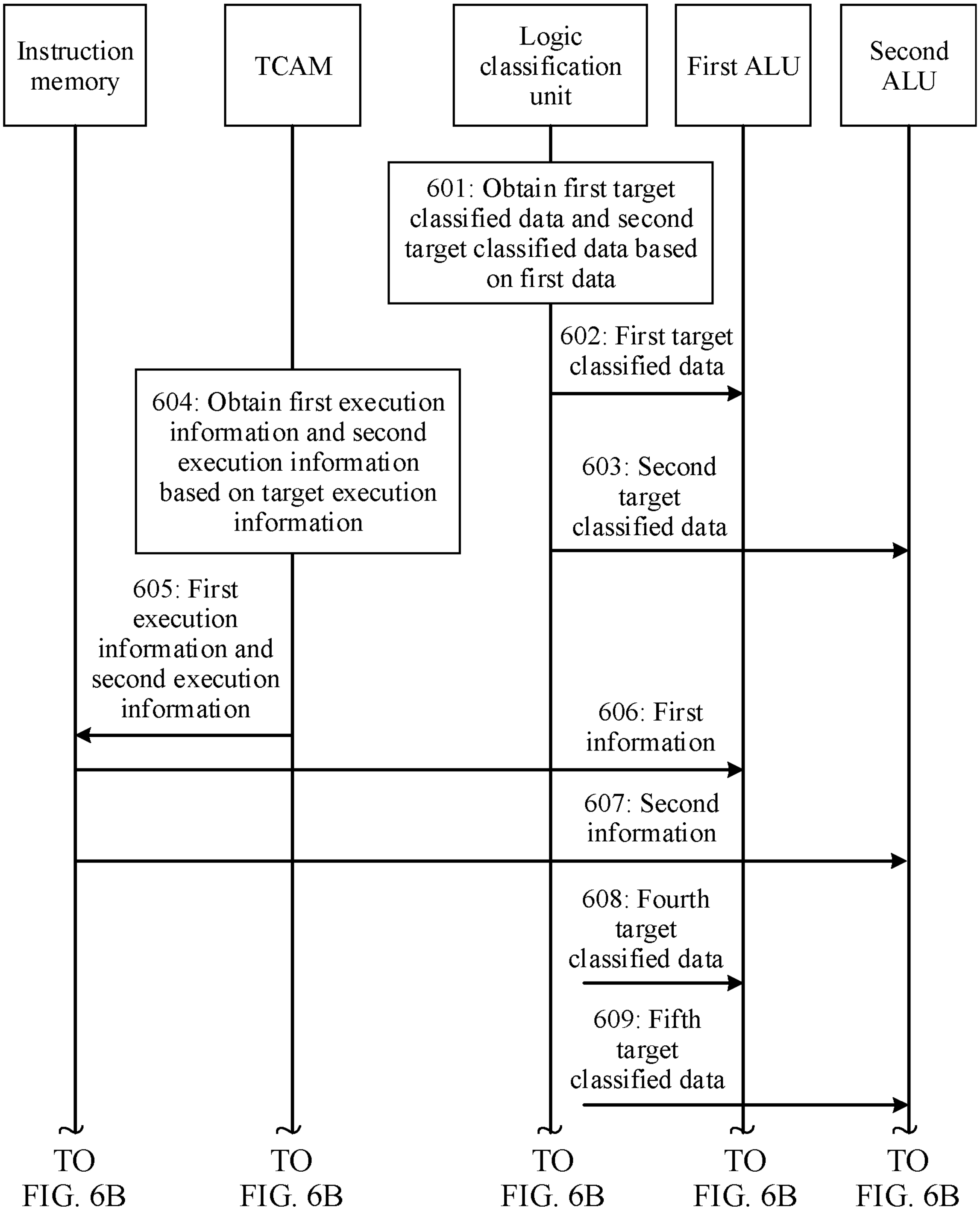
FIG. 6A and FIG. 6B are a schematic flowchart of a data processing method according to an embodiment of this application.
Figure 6B:
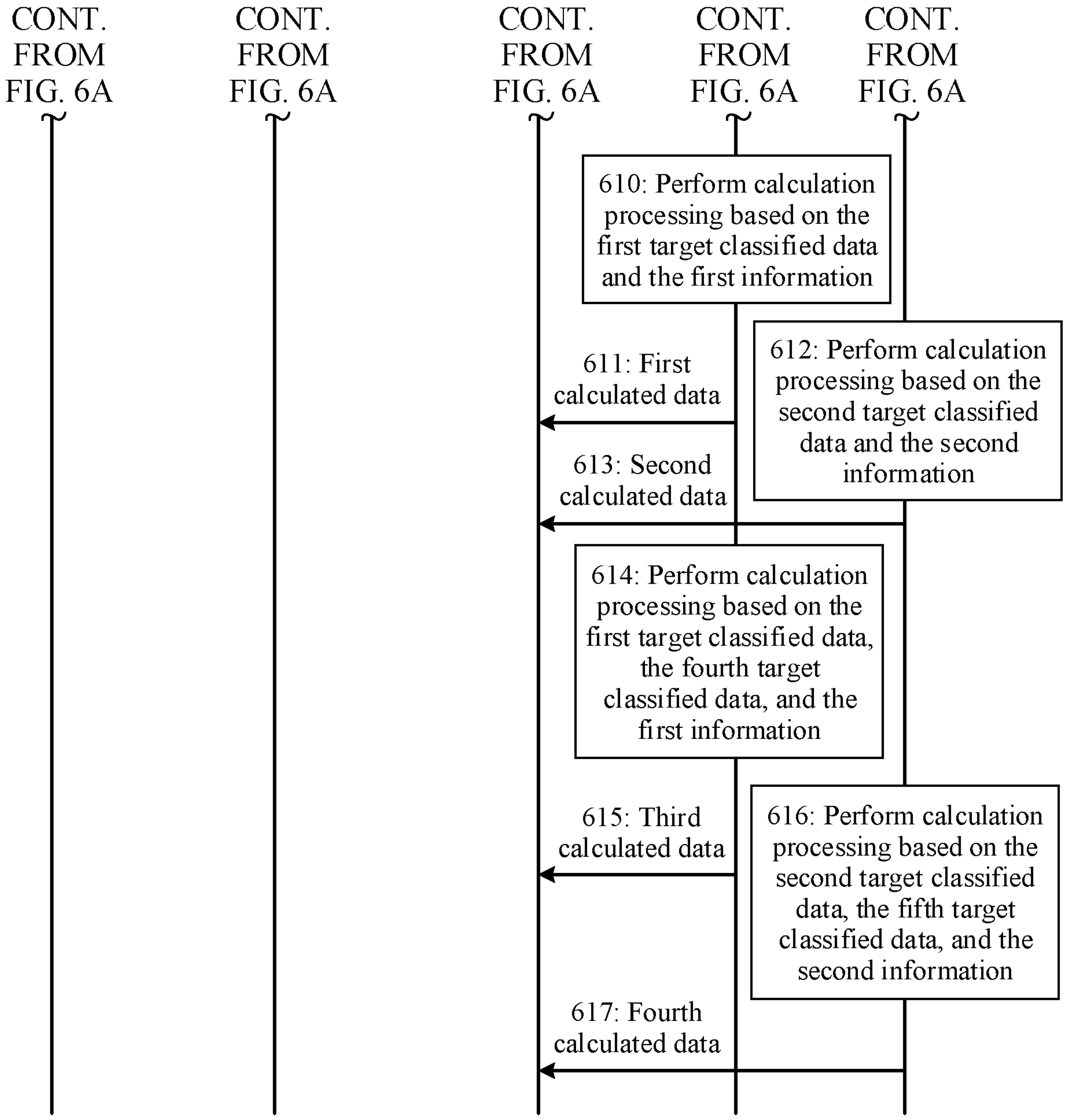

The following describes the data processing method in embodiments of this application with reference to the interaction system in the foregoing embodiments of this application. A person of ordinary skill in the art may learn that, with technology development and emergence of a new scenario, the technical solutions provided in embodiments of this application are also applicable to resolving a similar technical problem. For details, refer to FIG. 6A and FIG. 6B. FIG. 6A and FIG. 6B are a schematic flowchart of a data processing method according to an embodiment of this application. The method includes the following steps.

601: Obtain first target classified data and second target classified data based on first data.

A logic classification unit processes the received first data transmitted through a data bus, to obtain the first target classified data and the second target classified data. The first data includes service data that is determined based on a preset identifier and on which calculation needs to be performed by an ALU, and entry return data that is obtained through preprocessing an entry that is obtained through querying the service data. The logic classification unit processes the first data based on data intersection between different functions of services, to obtain the first target classified data and the second target classified data that are of at least two categories. In this embodiment of this application and the following, only an example in which the logic classification unit obtains the first target classified data and the second target classified data that are of the two categories is used. In some embodiments, through processing the first data, the logic classification unit may alternatively obtain target classified data of three categories, or obtain target classified data of four and more categories. This is not limited herein.

Optionally, the target classified data obtained by the logic classification unit through processing the first data may be a part of the first data, or may be a part of related data obtained through processing the first data based on some algorithms or definitions. In another embodiment, the target classified data may be a part of other data. This is not limited herein.

In an implementation of this application, the service data that is determined based on the preset identifier and on which the calculation needs to be performed by the ALU has been described in the foregoing programmable processing architecture. Details are not described herein again.

In some implementations of this application, for that the logic classification unit processes the first data based on data intersection between different functions of services, refer to the following examples. For example, two functions in a layer-3 service, namely, reducing time to live (TTL) by 1 per hop and assigning a class, do not have data dependency or interact with each other. Therefore, when a layer-3 switching service is being processed, data of the two functions may be processed as data of two categories. Alternatively, data corresponding to functions such as performing statistics assignment and statistics data collection on a service that are completely parallel and have no data dependency with each other may be processed as data of two categories for processing. In some embodiments, three, four, or more categories may be obtained through classification based on parallel functions in a service. This is not limited herein.

In some implementations of this application, a control signal that participates in calculation of all ALUs may be further processed as third target classified data. For example, a same control signal used in actions of discarding a packet during reducing TTL by 1 and discarding a packet during re-assigning a class is defined as the third target classified data. Alternatively, another control signal that may be used in a plurality of parallel functions may be defined as third target classified data. This is not limited herein.

In a possible implementation, when there are ALUs of three or more categories, the third target classified data may participate only in calculation of ALUs of at least two of the three or more categories. This is not limited herein.

602: Send the first target classified data to a first ALU.

The logic classification unit sends, through the data bus, the first target classified data to the first ALU based on a preset mapping relationship.

It should be noted that, in a possible implementation, the logic classification unit further sends, through the data bus, the third target classified data to the first ALU based on the preset mapping relationship.

In this embodiment of this application, the first ALU and a second ALU are ALUs of different categories in an ALU array. For details, refer to FIG. 5. In this embodiment of this application, the ALU array may be defined, based on preset category identifiers, as at least two categories: a first classified ALU array and a second classified ALU array. In addition, both the first classified ALU array and the second classified ALU array include a plurality of ALUs. The first ALU belongs to any sequence in the first classified ALU array, and the second ALU belongs to any sequence in the second classified ALU array. The first ALU may alternatively belong to the second classified ALU array, and the second ALU may alternatively belong to the first classified ALU array. This is not limited herein. Optionally, identification fields in the category identifiers may be defined as different natural numbers representing different classified ALU arrays, or different letters representing different classified ALU arrays, or other characters that may be used for distinguishing between different ALU arrays. This is not limited herein. In this embodiment of this application and the following, only the first classified ALU array and the second classified ALU array are used as examples. In some embodiments, the ALU array may be defined as classified ALU arrays of three, four, or more categories based on the preset category identifier. This is not limited herein.

In this embodiment of this application, a mapping relationship may be a mapping relationship between the first target classified data and the first ALU, or a mapping relationship is a connection relationship between a first output interface of the data bus and a read interface of the first ALU. Output interfaces of the data bus are classified into the first output interface and a second output interface, which have no intersection with each other.

Figure 7:
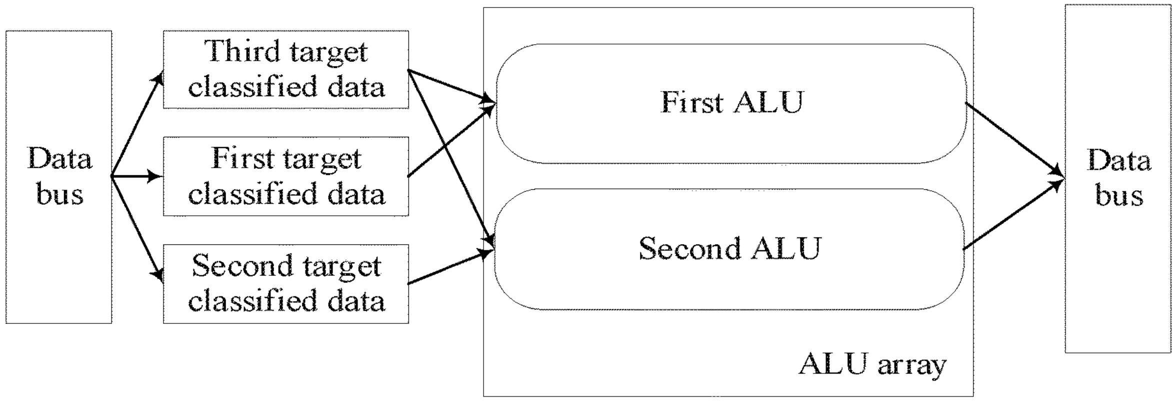
FIG. 7 is a schematic diagram of a mapping relationship according to an embodiment of this application.

Manner 1: The mapping relationship is the mapping relationship between the first target classified data and the first ALU. For details, refer to FIG. 7. FIG. 7 is a schematic diagram of a mapping relationship according to an embodiment of this application.

After the logic classification unit processes the first data based on the data intersection between the different functions of the services, the obtained first target classified data is defined to be interconnected with ALUs in the first classified ALU array. The first ALU belongs to the first classified ALU array. Therefore, there is a mapping relationship between the first target classified data and the first ALU.

In a possible implementation, the logic classification unit further obtains the third target classified data, where the third target classified data needs to participate in the calculation of all the ALUs. All the third target classified data in this case is interconnected with all the ALUs in the ALU array. Therefore, the third target classified data is defined to have mapping relationships with all the ALUs that include but are not limited to the first ALU and the second ALU.

A hardware connection does not need to be considered in a mapping relationship between target classified data and an ALU, where an interconnection relationship between classified data and a classified ALU may be customized, and this improves flexibility of the solution, and increases application scenarios of the solution. In addition, that mapping is performed between the first target classified data and the second ALU may alternatively be defined. This is not limited herein.

Figure 8:
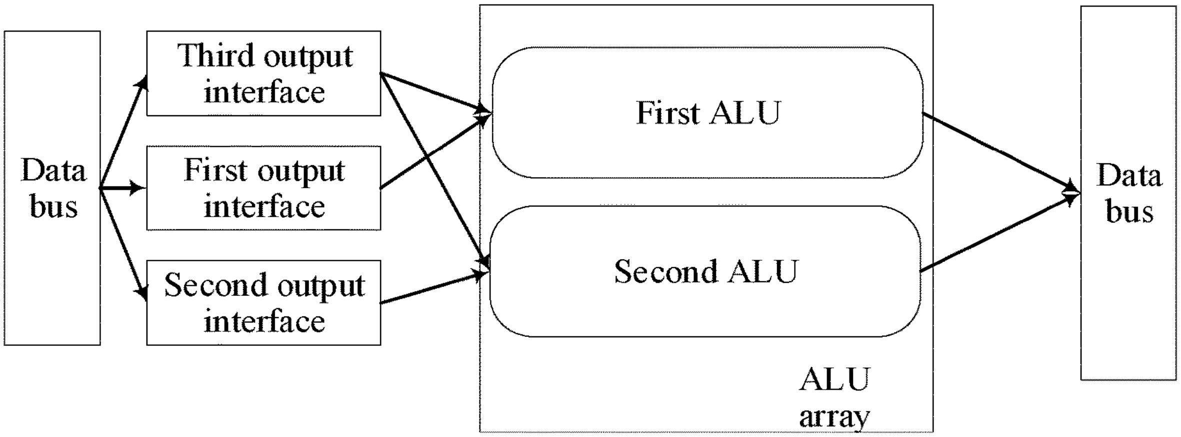
FIG. 8 is another schematic diagram of a mapping relationship according to an embodiment of this application.

Manner 2: The mapping relationship is the connection relationship between the first output interface of the data bus and the read interface of the first ALU. The output interfaces of the data bus are classified into the first output interface and the second output interface, which have no intersection with each other. For details, refer to FIG. 8. FIG. 8 is another schematic diagram of a mapping relationship according to an embodiment of this application.

The output interfaces of the data bus are classified into the first output interface and the second output interface, and there is no intersection between the first output interface and the second output interface. Hardware connections are established between the first output interface of the data bus and read interfaces of only the ALUs that belong to the first classified ALU array. Because the first ALU belongs to the first classified ALU array, there is a connection relationship between the first ALU and the first output interface. Therefore, the first ALU may obtain the first target classified data in the data bus through the first output interface based on the connection relationship.

In a possible implementation, the mapping relationship further includes third connection relationships, the output interfaces of the data bus further include a third output interface, and the third connection relationships are a connection relationship between the third output interface and the first ALU, and a connection relationship between the third output interface and the second ALU. The third target classified data needs to participate in at least calculation of the first ALU and the second ALU. All the third target classified data in this case is interconnected to at least the first ALU and the second ALU. Therefore, the third output interface of the data bus needs to establish hardware connections to at least the read interface of the first ALU and a read interface of the second ALU, to ensure that the first ALU and the second ALU may obtain the third target classified data through the third output interface.

Through establishing a hardware connection mapping relationship between a classified output interface of the data bus and a corresponding ALU, data may be obtained more directly, thereby improving efficiency.

603: Send the second target classified data to the second ALU based on the preset mapping relationship.

The logic classification unit sends, through the data bus, the second target classified data to the second ALU based on the preset mapping relationship.

In this embodiment of this application, a mapping relationship is a mapping relationship between the second ALU and the second target classified data. A specific implementation form is similar to the mapping relationship between the first target classified data and the first ALU. Details are not described herein again. Alternatively, a mapping relationship is a connection relationship between the second output interface of the data bus and the read interface of the second ALU. A specific implementation form is similar to the connection relationship between the first output interface of the data bus and the read interface of the first ALU in step 602. Details are not described herein again. In some embodiments of this application, an implementation form of the mapping relationship is not limited herein.

In a possible implementation, the logic classification unit further sends, through the data bus, the third target classified data to the second ALU based on the preset mapping relationship. A specific mapping relationship is similar to that described in step 602, and details are not described herein again.

A sequence of performing step 603 and step 602 is not limited. Step 602 or step 603 may be performed first. Alternatively, step 602 and step 603 may be performed at the same time. This is not further limited herein.

604: Obtain first execution information and second execution information based on target execution information.

A TCAM processes the target execution information, to obtain the first execution information and the second execution information. The TCAM herein has a function of the logic classification unit through software preconfiguration, or the TCAM may include a circuit or a component having a classification function. The target execution information is obtained through preprocessing the entry and the service data by the TCAM. Then, the TCAM processes the target execution information based on the preset data intersection between the different functions of the services, so that at least the first execution information and the second execution information corresponding to ALUs of different categories may be obtained.

That the TCAM performs classification herein is merely used as an example. In a possible implementation, the TCAM may alternatively send the target execution information to the logic classification unit, and the logic classification unit performs classification, to obtain the first execution information and the second execution information. This is not limited herein.

In some embodiments, a classification scheme defined based on the data intersection between the different functions of the services is defined based on specific service data and a classification scheme corresponding to the first data. In addition, in this embodiment of this application, in a specific solution, one TCAM may classify execution information of a plurality of categories, or a plurality of TCAMs may respectively obtain execution information of different categories. This is not limited herein.

In this embodiment of this application and the following, that the TCAM processes the target execution information to obtain the first execution information and the second execution information is merely used as an example. In another embodiment, the TCAM may obtain execution information of a corresponding quantity of different categories based on a quantity of classified ALU arrays included in an ALU array, or obtain execution information of a corresponding quantity of different categories based on a quantity of target classified data obtained by the logic classification unit. This is not further limited herein.

Herein, an execution sequence of step 604 and any one of step 601 to step 603 is not limited.

605: Send the first execution information and the second execution information to an instruction memory.

The TCAM sends the first execution information and the second execution information to the instruction memory. The instruction memory searches the instruction memory for information such as a calculation operation and a calculation step of a corresponding ALU based on the received first execution information and second execution information, to determine first information corresponding to the first ALU and second information corresponding to the second ALU.

In a possible implementation, the logic classification unit may send the first execution information and the second execution information to the instruction memory.

In addition, in this embodiment of this application, the instruction memory may be an instruction memory corresponding to an ALU of any sequence in the ALU array. Instruction memories corresponding to all sequences in the ALU array receive execution information sent by the TCAM. In this way, the instruction memory may determine, based on the execution information, calculation-related information such as a calculation operation and a calculation step of any ALU.

Herein, an execution sequence of step 605 and any one of step 601 to step 603 is not limited.

606: Send the first information to the first ALU.

The instruction memory sends the first information to the first ALU. The instruction memory sends, to the corresponding first ALU, the first information that includes the calculation-related information such as the calculation step and the calculation operation. The instruction memory determines, based on an identifier carried in the first execution information that is obtained through classification performed by the TCAM, a category of an ALU to which the instruction memory needs to perform sending. The identifier may be a preset fixed value, a character, or a category identifier of a corresponding ALU. This is not limited herein. Alternatively, the instruction memory may classify output interfaces of the TCAM, and determines, based on execution information of an ALU corresponding to a specific classified output interface of the TCAM, that received information is output by the specific output interface of the TCAM, to determine the corresponding ALU. In some embodiments, any one of the foregoing determining manners may be used. This is not limited herein.

In addition, an execution sequence of step 606 and any one of step 601 to step 603 is not limited.

607: Send the second information to the second ALU.

The instruction memory sends the second information to the second ALU.

Step 607 is similar to step 606, and details are not described herein again.

In addition, an execution sequence of step 607 and any one of step 601 to step 603 or step 606 is not limited.

In addition, herein, when the first ALU and the second ALU do not belong to an $N^{th}$ sequence in the ALU array, and N is greater than or equal to 2, step 608 and step 609 do not need to be performed after step 607, step 610 to step 613 are directly performed, and step 614 to step 617 are not performed. When the first ALU and the second ALU belong to the $N^{th}$ sequence in the ALU array, and N is greater than or equal to 2, step 608 and step 609 further need to be performed after step 607 and before step 611, step 610 to step 613 are not performed, and step 614 to step 617 are directly performed. Details are as follows.

Manner 1: When the first ALU and the second ALU do not belong to the $N^{th}$ sequence in the ALU array, and N is greater than or equal to 2, step 610 to step 613 are directly performed after step 607.

610: Perform calculation processing based on the first target classified data and the first information.

The first ALU performs calculation based on the first target classified data and the first information, to obtain first calculated data. The first ALU determines the calculation-related information such as the calculation step and the calculation operation based on the received first information, and performs calculation on the first target classified data, to obtain a corresponding calculated result, namely, the first calculated data.

611: Send the first calculated data.

The first ALU sends the first calculated data based on a preset fourth connection relationship.

In this embodiment of this application, the fourth connection relationship is a full connection between a calculation output interface of the first ALU and the data bus, or a preset connection relationship of a classified connection between the first ALU and a first input interface of the data bus.

a. The preset fourth connection relationship is the full connection.

If the fourth connection relationship is the full connection, it indicates that a hardware connection relationship is established between a calculation output interface of a classified ALU in the ALU array and any input interface of the data bus. Any ALU in the ALU array in this case may write an output result to the data bus through any input interface of the data bus. For details, refer to FIG. 4. When outputting data obtained through calculation, the ALU directly writes the data to the data bus without classifying the data.

The calculation output interface of the ALU is fully connected to the data bus. This improves the flexibility of the solution and flexibility of a system, so that the solution is applicable to more application scenarios.

b. The preset fourth connection relationship is the preset connection relationship of the classified connection between the first ALU and the first input interface of the data bus.

Figure 9:
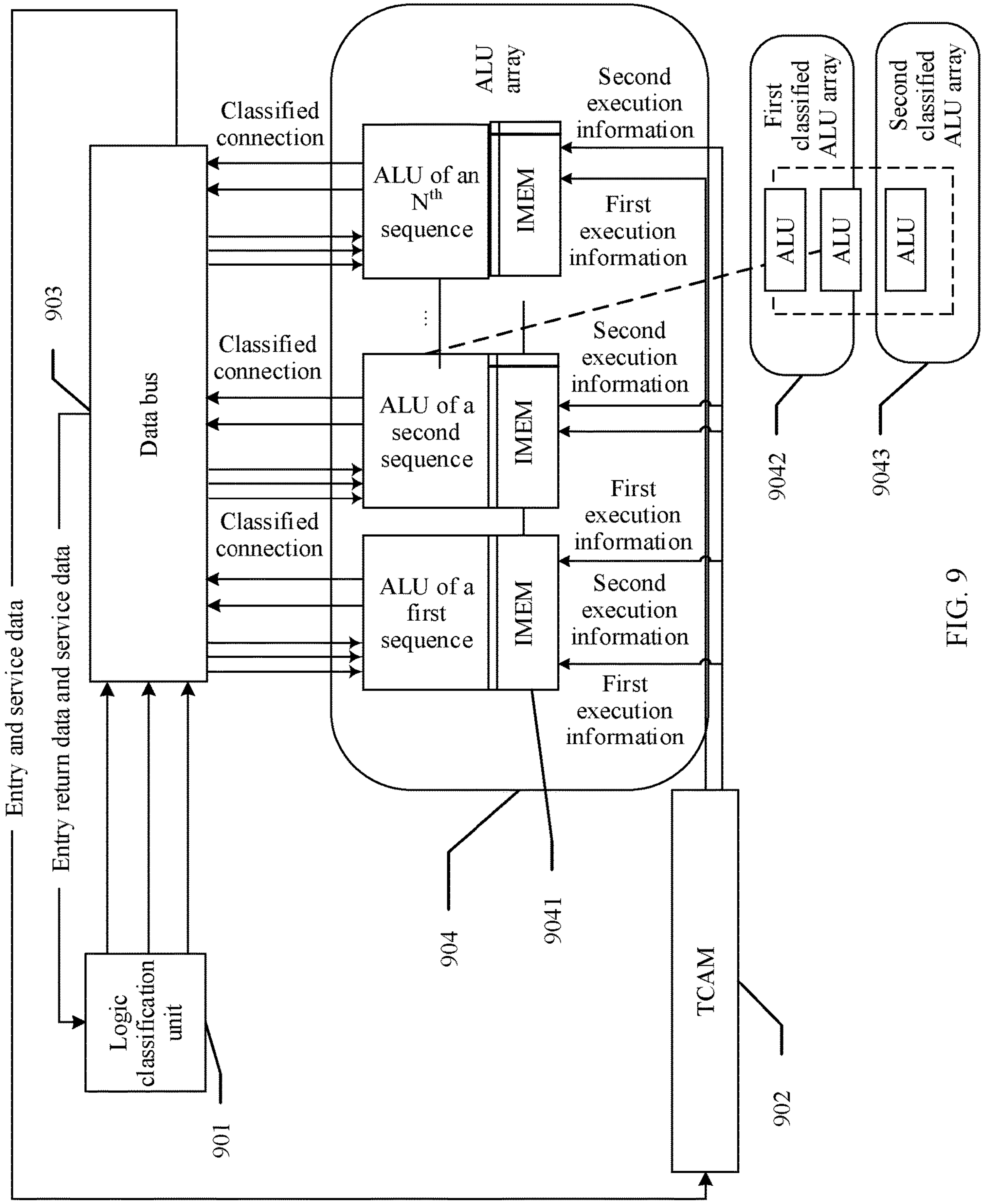
FIG. 9 is another schematic diagram of an architecture of an interaction system according to an embodiment of this application.

Input interfaces of the data bus are classified into at least the first input interface and a second input interface, and there is no intersection between the first input interface and the second input interface. The first input interface of the data bus establishes a hardware connection only to a calculation output interface of an ALU belonging to the first classified ALU array or the second classified ALU array, and the second input interface of the data bus establishes a hardware connection to an ALU of the other category. In this case, data obtained through calculation performed by the ALU may be output only to a corresponding input interface of the data bus through the determined hardware connection. For details, refer to FIG. 9. FIG. 9 is another schematic diagram of an architecture of an interaction system according to an embodiment of this application. As shown in the figure, an ALU classifies data obtained through calculation, and then separately sends the data to a corresponding input interface of a data bus, to write the data into the data bus. If there are ALUs of three or more categories, input interfaces of the data bus may alternatively be classified into input interfaces of corresponding categories. This is not limited herein.

Through establishing a hardware connection relationship between an input interface obtained through data bus classification and a calculation output interface of an ALU of a corresponding category, the solutions may be implemented by using fewer connection lines, to further reduce costs for physical implementation.

The fourth connection relationship is not limited herein.

612: Perform calculation processing based on the second target classified data and the second information.

The second ALU performs calculation processing based on the second target classified data, fourth target classified data, and the second information, to obtain second calculated data.

Step 612 is similar to step 610, and details are not described herein again.

In addition, an execution sequence of step 612 and step 610 or step 611 is not limited.

613: Send the second calculated data.

The second ALU sends the second calculated data based on the preset fourth connection relationship.

In this embodiment of this application, the fourth connection relationship is a full connection between a calculation output interface of the second ALU and the data bus, or a connection relationship between a calculation output interface of the second ALU and the second input interface of the data bus. This is not limited herein.

In addition, step 613 is similar to step 611, and details are not described herein again.

In addition, an execution sequence of step 613 and step 610 or step 611 is not limited.

Manner 2: When the first ALU and the second ALU belong to the $N^{th}$ sequence in the ALU array, and N is greater than or equal to 2, step 608 and step 609 further need to be performed after step 607. Then, step 610 to step 613 are not performed, and step 614 to step 617 are directly performed.

608: Obtain the fourth target classified data.

The first ALU obtains the fourth target classified data based on the preset mapping relationship, where the fourth target classified data is an output result that is of an ALU of a sequence in the ALU array and that is received through the data bus based on a preset first connection relationship.

When the first ALU and the second ALU respectively belong to the $N^{th}$ sequence in the first classified ALU array and the $N^{th}$ sequence in the second classified ALU array, and N is greater than or equal to 2, the data bus may transmit an output result of an ALU in an $(N-1)^{th}$ sequence in the ALU array based on the preset first connection relationship, and then the first ALU may obtain the fourth target classified data based on the first information sent by the instruction memory. In addition, the first connection relationship may be a full connection between an input interface of the data bus and a calculation output interface of an ALU, or may be a classified connection between the classified first input interface and the classified second input interface of the data bus and a classified ALU. The mapping relationship in this embodiment of this application is similar to the mapping relationship described in detail in step 602, and the first connection relationship is similar to a connection relationship in step 612. Details are not described herein again.

In this embodiment of this application, the mapping relationship is a mapping relationship between the first ALU and the fourth target classified data, or the mapping relationship is a connection relationship between the first output interface of the data bus and the read interface of the first ALU. The mapping relationship herein is similar to the mapping relationship described in detail in step 602, and details are not described herein again. In addition, in some embodiments, a specific form of the mapping relationship may be any one of the foregoing forms. This is not limited herein.

609: Obtain fifth target classified data.

The second ALU obtains the fifth target classified data based on the preset mapping relationship, where the fifth target classified data is an output result that is of an ALU of a sequence in the ALU array and that is received through the data bus based on the preset first connection relationship. The second ALU obtains the fifth target classified data based on the second information sent by the instruction memory.

In this embodiment of this application, the mapping relationship is a mapping relationship between the second ALU and the fifth target classified data, or the mapping relationship is a connection relationship between the second output interface of the data bus and the read interface of the second ALU. The mapping relationship is similar to the mapping relationship in step 608, and details are not described herein again. In addition, in another embodiment, a specific form of the mapping relationship may be any one of the foregoing forms. This is not limited herein.

Herein, an execution sequence of step 606 and step 605 is not limited.

614: Perform calculation processing based on the first target classified data, the fourth target classified data, and the first information.

The first ALU performs calculation based on the first target classified data, the fourth target classified data, and the first information, to obtain third calculated data. The first ALU determines the calculation-related information such as the calculation step and the calculation operation based on the received first information, and performs calculation on the fourth target classification data based on some data that participates in the calculation and that is carried in the first target classified data, to obtain a corresponding calculation result, namely, the third calculated data.

615: Send the third calculated data.

The first ALU sends the third calculated data based on the preset fourth connection relationship.

In this embodiment of this application, the fourth connection relationship is a full connection between the calculation output interface of the first ALU and the data bus, or a connection relationship between the calculation output interface of the first ALU and the first input interface of the data bus. The input interfaces of the data bus are classified into the first input interface and the second input interface, which have no intersection with each other. This is not limited herein.

In addition, the first connection relationship herein is similar to the first connection relationship in step 608. Therefore, details are not described herein again.

616: Perform calculation processing based on the second target classified data, the fifth target classified data, and the second information.

The second ALU performs calculation processing based on the second target classified data, the fifth target classified data, and the second information, to obtain fourth calculated data.

Step 616 is similar to step 614, and details are not described herein again.

In addition, an execution sequence of step 616 and step 614 or step 615 is not limited.

617: Send the fourth calculated data.

The second ALU sends the fourth calculated data based on the preset fourth connection relationship.

In this embodiment of this application, the fourth connection relationship in this case is the full connection between the calculation output interface of the second ALU and the data bus, or the connection relationship between the calculation output interface of the second ALU and the second input interface of the data bus. This is not limited herein.

In addition, step 617 is similar to step 615, and details are not described herein again.

In addition, an execution sequence of step 617 and step 614 or step 615 is not limited.

Figure 10:
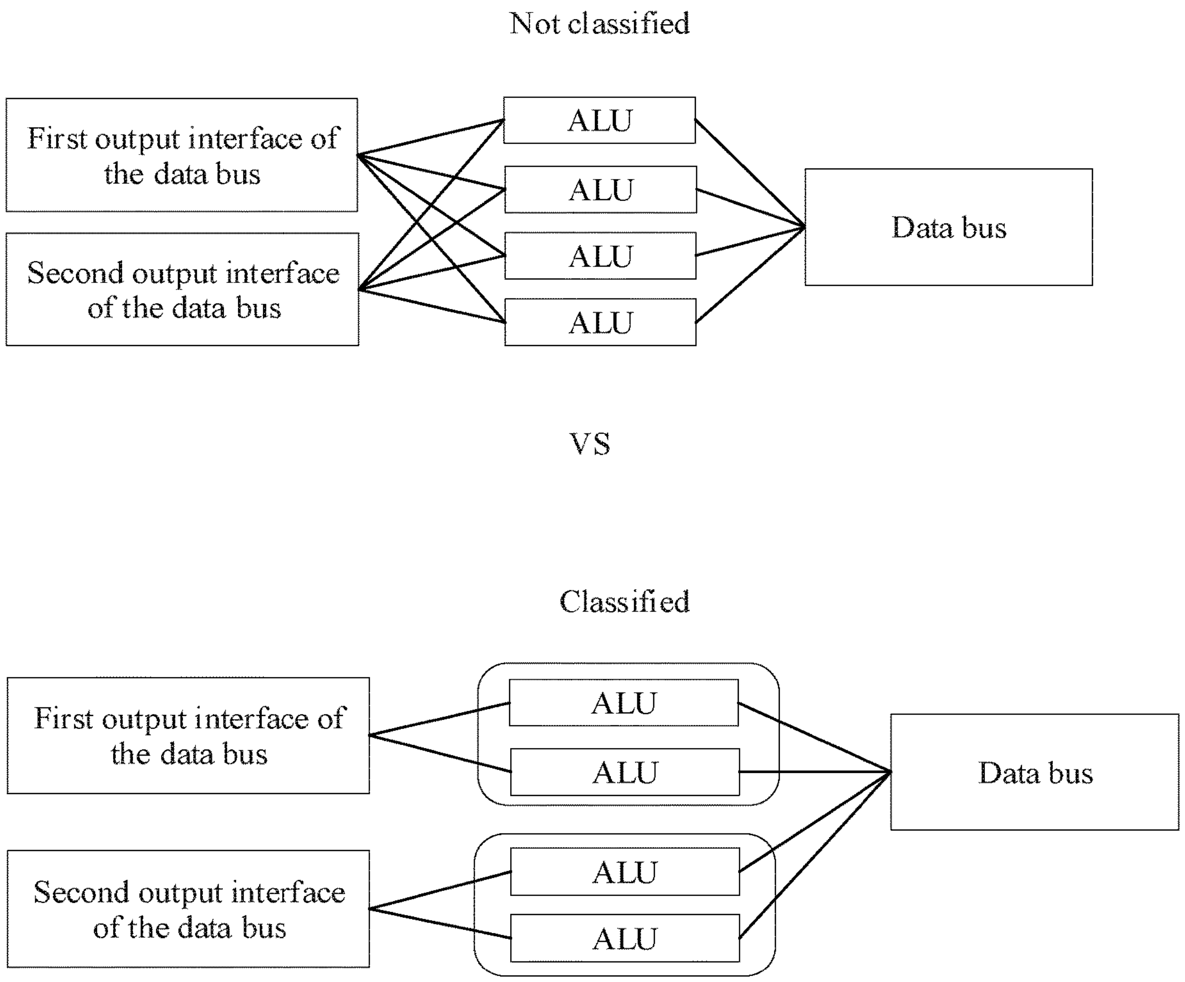
FIG. 10 is a schematic diagram of a beneficial effect according to an embodiment of this application.

In this embodiment of this application, the logic classification unit may obtain target classified data of at least two different categories based on the received first data, and send the target classified data to an ALU of one corresponding category based on a preset mapping relationship. The ALU sends a calculation result based on a preset connection relationship. In this case, for details, refer to FIG. 10. FIG. 10 is a schematic diagram of a beneficial effect according to an embodiment of this application. Compared with a solution in which an ALU is directly interconnected with all data and accesses all output interfaces of a data bus, a solution in which data is classified, and each ALU is connected only to corresponding data based on a connection relationship between a corresponding output interface of a data bus and a corresponding ALU or a mapping relationship between an ALU and corresponding target classified data reduces a quantity of connection lines or connection lines between the ALU and the data bus, and accordingly reduces a physical implementation area of a chip and costs for physical implementation.

The foregoing logic classification unit may be a cross matrix, a logic circuit, or a logic component. In some embodiments, the logic classification unit may alternatively be another software program or hardware circuit that can achieve a classification objective. This is not limited herein.

Figure 11:
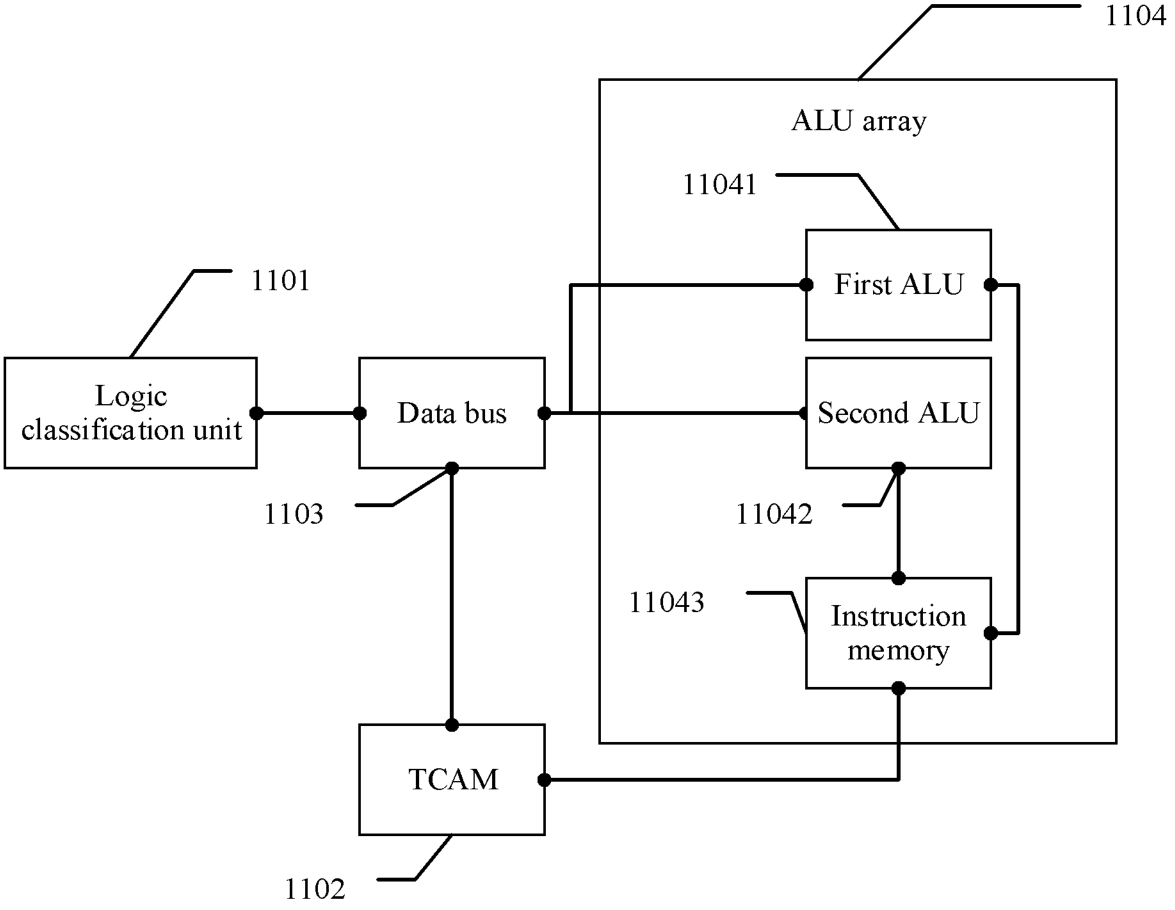
FIG. 11 is a schematic diagram of a structure of an interaction system according to an embodiment of this application.

An embodiment of this application provides an interaction system. The interaction system is applied to a chip. Refer to FIG. 11. FIG. 11 is a schematic diagram of an interaction system according to an embodiment of this application. The interaction system may include: a logic classification unit

1101, a TCAM 1102, a data bus 1103, and an ALU array 1104. The ALU array 1104 includes at least a first ALU 11041, a second ALU 11042, and an instruction memory 11043. The first ALU 11041 and the second ALU 11042 are ALUs of different categories in the ALU array 1104. The logic classification unit 1101 is configured to classify received first data, to obtain classified first target classified data and classified second target classified data. The data bus 1103 is configured to form first data by using entry return data obtained through preprocessing an entry, and service data, and transmit the first data to the logic classification unit 1101, receive the first target classified data and the second target classified data that are obtained through classification performed on the first data by the logic classification unit 1101, send the first target classified data to the corresponding first ALU 11041, and send the second target classified data to the corresponding second ALU 11042. In addition, the data bus 1103 is further configured to transmit the entry and the service data to the TCAM 1102. The TCAM 1102 is configured to classify and preprocess the entry and the service data, to obtain target execution information, where the target execution information is classified by the TCAM 1102 to obtain at least first execution information and second execution information, and send the first execution information and the second execution information to the instruction memory 11043. The instruction memory 11043 is configured to determine related information such as calculation operations and calculation steps of the first ALU 11041 and the second ALU 11042 based on the first execution information and the second execution information, and send the related information to the corresponding first ALU 11041 and the second ALU 11042. The first ALU 11041 and the second ALU 11042 are configured to process the received target classified data based on the received calculation-related information, and send data obtained through the calculation to the data bus.

In the foregoing embodiment of this application, first, the data bus 1103 separately transmits the first data to the logic classification unit 1101, transmits the entry and the service data to the TCAM 1102, and then transmits, to the corresponding first ALU 11041 and the second ALU 11042 that are of different categories, the first target classified data and the second target classified data that are obtained through classification performed by the logic classification unit 1101. The instruction memory 11043 determines the related information such as the calculation step and the calculation operation based on execution information that is of different categories and that is sent by the TCAM 1102, and sends the related information to the corresponding first ALU 11041 and second ALU 11042. Then, the first ALU 11041 and the second ALU 11042 perform calculation processing on the target classified data based on the received calculation-related information, and send the data obtained through the calculation to the data bus 1103. In addition, in the foregoing embodiment of this application, each ALU only needs to receive corresponding classified data, and does not need to be interconnected with all data. This reduces connection relationships between the ALU and the data, and accordingly reduces connection lines between the ALU and the data bus, to save connection resources, reduce costs for physical implementation, and reduce an implementation area of an application chip.

That the TCAM 1102 classifies the target execution information in FIG. 11 is merely used as an example. Alternatively, the target execution information may be sent to the logic classification unit for classification. This is not limited herein.

Content such as direct information exchange and an execution process of each module/unit in the interaction system described in the embodiment corresponding to FIG. 11 is based on a same concept as the method embodiment corresponding to FIG. 6A and FIG. 6B in this application. For specific content, refer to the descriptions in the foregoing method embodiment of this application. Details are not described herein again.

An embodiment of this application further provides a chip. The chip includes at least one processor configured to support a communication device in implementing any one of the functions implemented in the foregoing method embodiment. In a possible design, the chip system may further include a memory. The at least one processor is communicatively connected to the at least one memory. The at least one memory stores instructions, and is configured to store program instructions and data that are necessary for the communication device and a server. Optionally, the chip system further includes an interface circuit, and the interface circuit provides program instructions and/or data for the at least one processor.

An embodiment of this application further provides a communication device. The communication device is configured with a chip. The chip includes at least one processor configured to support a communication device in implementing any one of the functions implemented in the foregoing method embodiment.

An embodiment of this application further provides a computer program product. The computer program product includes computer program code. When the computer program code is run on a computer, the computer is enabled to perform any implementation shown in the foregoing method embodiment.

An embodiment of this application further provides a chip system, including a memory and a processor. The memory is configured to store a computer program, and the processor is configured to invoke the computer program from the memory and run the computer program, so that a chip performs any implementation shown in the foregoing method embodiment.

An embodiment of this application further provides a chip system, including a processor. The processor is configured to invoke and run a computer program, so that a chip performs any implementation shown in the foregoing method embodiment.

The described apparatus embodiment is merely an example. The units described as separate parts may or may not be physically separate, and parts displayed as units may or may not be physical units, may be located in one position, or may be distributed on a plurality of network units. Some or all the modules may be selected based on actual needs to achieve the objectives of the solutions of embodiments. In addition, in the accompanying drawings of the apparatus embodiments provided by this application, connection relationships between modules indicate that the modules have communication connections with each other, which may be further implemented as one or more communication buses or signal cables.

Based on the descriptions of the foregoing implementations, a person skilled in the art may clearly understand that this application may be implemented by software in addition to necessary universal hardware, or by dedicated hardware, including a dedicated integrated circuit, a dedicated central processing unit (CPU), a dedicated memory, a dedicated component, and the like. Generally, any functions that can be performed by a computer program can be easily implemented by using corresponding hardware. Moreover, a specific hardware structure used to achieve a same function may be in various forms, for example, in a form of an analog circuit, a digital circuit, or a dedicated circuit. However, as for this application, software program implementation is a better implementation in most cases. Based on such an understanding, the technical solutions in this application essentially or the part contributing to the conventional technology may be implemented in a form of a software product. The computer software product is stored in a readable storage medium, such as a floppy disk, a Universal Serial Bus (USB) flash drive, a removable hard disk, a read-only memory (ROM), a random-access memory (RAM), a magnetic disk, or an optical disc of a computer, and includes several instructions for indicating a computer device to perform the method in embodiments of this application.

All or a part of the foregoing embodiments may be implemented by using software, hardware, firmware, or any combination thereof. When software is used to implement embodiments, all or a part of the embodiments may be implemented in a form of a computer program product.

The computer program product includes one or more computer instructions. When the computer program instructions are loaded and executed on the computer, the procedure or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a web site, computer, communication apparatus, computing device, or data center to another website, computer, communication apparatus, computing device, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a communication apparatus or a data center, integrating one or more usable media. The usable medium may be a magnetic medium (for example, a floppy disk, a hard disk, or a magnetic tape), an optical medium (for example, a DIGITAL VERSATILE DISC (DVD)), a semiconductor medium (for example, a solid-state drive (SSD)), or the like.

It should be understood that "one embodiment" or "an embodiment" mentioned in the entire specification means that particular features, structures, or characteristics related to embodiments are included in at least one embodiment of this application. Therefore, "in one embodiment" or "in an embodiment" appearing throughout the specification does not necessarily refer to a same embodiment. In addition, these particular features, structures, or characteristics may be combined in one or more embodiments in any appropriate manner. It should be understood that sequence numbers of the foregoing processes do not mean execution sequences in various embodiments of this application. The execution sequences of the processes should be determined based on functions and internal logic of the processes, and should not be construed as any limitation on the implementation processes of embodiments of this application.

In addition, the terms "system" and "network" may be used interchangeably in this specification. The term "and/or" in this specification describes only an association relationship between associated objects and represents that three relationships may exist. For example, A and/or B may represent the following three cases: only A exists, both A and B exist, and only B exists. In addition, the character "/" in this specification generally indicates an "or" relationship between the associated objects.

It should be understood that in embodiments of this application, "B corresponding to A" indicates that B is associated with A, and B may be determined based on A. However, it should be further understood that determining B based on A does not mean that B is determined based only on A. B may alternatively be determined based on A and/or other information.

A person of ordinary skill in the art may be aware that, in combination with the examples described in embodiments disclosed in this specification, units and algorithm steps can be implemented by electronic hardware, computer software, or a combination thereof. To clearly describe the interchangeability between the hardware and the software, the foregoing has generally described compositions and steps of each example based on functions. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division of the units is only logic function division, and may be other division during actual implementation. For example, a plurality of units or components may be combined or may be integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all the units may be selected based on actual needs to achieve the objectives of the solutions of embodiments.

In addition, function units in embodiments of this application may be integrated into one processing unit, or each of the units may exist alone physically, or two or more units may be integrated into one unit. The integrated unit may be implemented in a form of hardware, or may be implemented in a form of a software function unit.

When the integrated unit is implemented in the form of the software function unit and sold or used as an independent product, the integrated unit may be stored in a computer-readable storage medium. Based on such an understanding, the technical solutions of this application essentially, or the part contributing to the conventional technology, or all or some of the technical solutions may be implemented in a form of a software product. The computer software product is stored in a storage medium and includes several instructions for indicating a computer device (which may be a personal computer, a server, or a network device) to perform all or some of the steps of the methods described in embodiments of this application. The foregoing storage medium includes any medium that can store program code, such as a USB flash drive, a removable hard disk, a ROM, a RAM, a magnetic disk, or an optical disc.

What is claimed is:

1. A data processing method comprising:

processing first data based on data intersection between different function of services to obtain first target classified data and second target classified data, wherein the first target classified data and the second target classified data are of different categories, and wherein the first data comprises service data and entry return data that is based on preprocessing an entry; and sending, based on a preset mapping relationship, the first target classified data to a first arithmetic logic unit (ALU) and the second target classified data to a second ALU, wherein the second ALU and the first ALU are of different categories.

2. The data processing method of claim 1, further comprising avoid sending the second target classified data to the first ALU.

3. The data processing method of claim 2, further comprising:

obtaining third target classified data based on the first data; and sending the third target classified data to the first ALU and the second ALU.

4. The data processing method of claim 3, further comprising performing, by a logic classifier, the data processing method.

5. The data processing method of claim 4, wherein the logic classifier comprises at least any oneone of a cross matrix, a logic circuit, or a logic component.

6. The data processing method of claim 5, further comprising obtaining, through querving the service data, the entry.

7. The data processing method of claim 6, further comprising determining, based on a preset identifier, the service data.

8. The data processing method of claim 7, further comprising:

processing target execution information based on the data intersection to obtain first execution information and second execution information, wherein the first execution information and the second execution information are of different categories, and wherein the target execution information is obtained through preprocessing the entry and the service data by a ternary content-addressable memory (TCAM); and sending the first execution information and the second execution information to an instruction memory to enable the instruction memory to determine first information and second information based on the first execution information and the second execution information and send the first information to the first ALU and the second information to the second ALU.

9. The data processing method of claim 8, wherein the preset mapping relationship comprises a first mapping relationship between a third ALU and fourth target classified data, wherein the third ALU comprises the first ALU and the second ALU, wherein the fourth target classified data comprises the first target classified data and the second target classified data, wherein the first ALU corresponds to the first target classified data, and wherein the second ALU corresponds to the second target classified data, or wherein the preset mapping relationship comprises:

a first connection relationship relationship between a first output interface of a data bus and a read interface of the first ALU; and a second connection relationship between a second output interface of the data bus and a read interface of the second ALU, and wherein the first output interface and the second output interface do not comprise an intersection.

10. The da ta processing method of claim 9, wherein the fourth target classified data further comprises the third target classified data, and wherein the preset mapping relationship further comprises:

a second mapping relationship between the first ALU and the third target classified data and a third mapping relationship between the second ALU and the third target classified data; or third connection relationships comprising a third connection relationship between a third output interface of the data bus and the read interface of the first ALU and a fourth connection relationship between the third output interface and the read interface of the second ALU.

11. An interaction system comprising:

an arithmetic logic unit (ALU) array comprising a first ALU and a second ALU that are of different categories; and a logic classifuer coupled to the ALU array and configured to:

process first data based on data intersection between different functions of sevices to obtain first target classified data and second target classified data wherein the first target classified data and the second target classified data are of different categories, and wherein the first data comprises service data and entry return data that is preprocessing an entry; and send, based on a preset mapping relationship, the first target classified data to the first ALU, and the second target classified data to the second ALU.

12. The interaction system of claim 11, wherein the logic classification circuit is further configured to avoid sending the second target classified data to the first ALU.

13. The interaction system of claim 12, wherein the logic classification circuit is further configured to:

obtain third target classified data based on the first data; and send the third target classified data to the first ALU and the second ALU.

14. The interaction system of claim 13, wherein the logic classification circuit comprises at least one of a cross matrix, a logic circuit, or a logic component.

15. The interaction system according toof claim 14, wherein the logic classification circuit is further configured to obtain, through querying the service data, the entry.

16. The interaction system claim 15, wherein the logic classification circuit is further configured to determine based on a preset identifier the service data.

17. The interaction system of claim 16, wherein the ALU array further comprises an instruction memory, and wherein the logic classification circuit is further configured to:

processing target execution information baed on the data to obtain first execution information and second execution information, wherein the first execution information and the second execution information are of the different categories, and wherein the target execution information is obtained through preprocessing the entry and the service data by a ternary content-addressable memory (TCAM); and sending the first execution information and the second execution information to the instruction memory, wherein the instruction memory is configured to:

determine first information and second information based on the first execution information and the second execution information; and send the first information to the first ALU and the second information to the second ALU.

18. The interaction system of claim 17, wherein the first ALU is configured to:

perform calculation based on the first target classified data and the first information to obtain first calculated data; and send, based on a preset connection relationship, the first calculated data, and wherein the second ALU is configured to:

perform calculation based on the second target classified data and the second information to obtain second calculated data; and send, based on the preset connection relationship, the second calculated data.

19. The interaction system of claim 18, wherein when the first ALU and the second ALU belong to an $N^{th}$ sequence in the ALU array, and N is greater than or equal to 2, the first ALU is further configured to:

obtain, based on the preset mapping relationship, fourth target classified data from data of a third ALU of an $(N-1)^{th}$ sequence in the ALU array, perform calculation based on the first target classified data, the fourth target classified data, and the first information to obtain third calculated data; and send the third calculated data based on the preset connection relationship, and wherein the second ALU is further configured to:

obtain, based on the preser mapping relationship, fifth target classified data from the data of the third ALU;

perform calculation based on the second target classified data, the fifth target classified data, and the second information t obtain fourth calculated data; and send the fourth calculated data based on the preset connection relationship.

20. A computer program product comprising computer-executable instructions that are stored on a non-transitory computer-readable medium and that, when executed by a processor cause an interaction system to be configured to:

process first data based on data intersection between different functions of services to obtain first target classified data and second target classified data, wherein the first target classified data and the second target classified data are of different categories, and wherein the first data comprises service data and entry return data that is based on preprocessing an entry; and send, based on a preset mapping relationship, the first target classified data to a first arithmetic logic unit (ALU) and the second target classified data to a second ALU, wherein the second ALU and the first ALU are of different categories.

* * * * *